US007291290B2

(12) United States Patent
Sakai et al.

(10) Patent No.: US 7,291,290 B2
(45) **Date of Patent: *Nov. 6, 2007**

(54) PHOSPHOR, METHOD OF MANUFACTURING SAME, AND PLASMA DISPLAY PANEL USING SAME

(75) Inventors: Masahiro Sakai, Yawata (JP); Takehiro Zakawa, Katano (JP); Seigo Shiraishi, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 266 days.

This patent is subject to a terminal disclaimer.

(21) Appl. No.: 10/929,857

(22) Filed: Aug. 30, 2004

(65) Prior Publication Data

US 2005/0077500 A1 Apr. 14, 2005

(30) Foreign Application Priority Data

Sep. 2, 2003 (JP) ............................ 2003-310580

(51) Int. Cl.
*C09K 11/08* (2006.01)

(52) U.S. Cl. ............................ 252/301.4 R; 313/582; 313/584

(58) Field of Classification Search .............. 252/301.4 R–301.6 F; 313/582, 584
See application file for complete search history.

(56) References Cited

U.S. PATENT DOCUMENTS

| | | | | |
|---|---|---|---|---|
| 4,075,495 | A * | 2/1978 | Stevels et al. | 250/483.1 |
| 4,157,981 | A * | 6/1979 | Stevels et al. | 252/301.4 H |
| 4,505,989 | A * | 3/1985 | Umemoto et al. | 428/691 |
| 5,279,765 | A * | 1/1994 | Ferretti | 252/301.4 H |
| 5,904,995 | A * | 5/1999 | Maezawa et al. | 428/690 |
| 2005/0046330 | A1* | 3/2005 | Okuyama et al. | 313/486 |
| 2005/0062417 | A1* | 3/2005 | Okuyama et al. | 313/582 |
| 2005/0277570 | A1* | 12/2005 | Zukawa et al. | 510/467 |

FOREIGN PATENT DOCUMENTS

| | | | |
|---|---|---|---|
| JP | 61-254689 | | 11/1986 |
| JP | 08-115673 | | 5/1996 |
| JP | 10-330746 | | 12/1998 |
| JP | 2000-034478 | | 2/2000 |
| JP | 2003-213258 | | 7/2003 |
| WO | WO 2004/031323 | * | 4/2004 |

* cited by examiner

*Primary Examiner*—C. Melissa Koslow

(57) ABSTRACT

An Eu-activated phosphor that maintains high wavelength conversion efficiency and suppresses deterioration with time due to vacuum ultraviolet irradiation, as well as a plasma display panel having superior display performance by suppressing sticking image caused by deterioration of the phosphor with time is provided. The europium-activated phosphor where a divalent europium ratio of each phosphor particle constituting the phosphor is lower at and in a vicinity of a particle surface than for the particle as a whole.

7 Claims, 5 Drawing Sheets

PHOSPHOR, METHOD OF MANUFACTURING SAME, AND PLASMA DISPLAY PANEL USING SAME

BACKGROUND OF THE INVENTION

1. Field of the Invention

The present invention relates to a phosphor, and more particularly to an alkaline earth metal aluminate phosphor activated by europium (Eu). The present invention also relates to a plasma display panel (PDP) that has a phosphor layer using the phosphor.

2. Description of the Related Art

In recent years, alkaline earth metal aluminate phosphors have been applied as low energy phosphors in 3-wavelength fluorescent lamps and the like. The following compositions are specific examples of such phosphors.

Blue Phosphor: $(Ba, Sr)MgAl_{10}O_{17}$:Eu

Green Phosphor: $CeMgAl_{11}O_{19}$:Eu or $BaMgAl_{10}O_{17}$:Eu, Mn

These phosphors are used separately or mixed with different phosphors or a red phosphor so as to achieve an emission color such as white luminescence.

As a blue phosphor for PDPs, $(Ba, Sr)MgAl_{10}O_{17}$:Eu having high wavelength conversion efficiency in the vacuum ultraviolet region has been utilized. By setting a molar quantity of Eu in a range of 5 mol % to 15 mol % of a total molar quantity of (Ba, Sr) and Eu, it is possible to achieve superior luminescence characteristics.

With the above lamps and PDPs, slurry made by mixing binder with the phosphor is applied to a substrate (e.g. glass) and baked to form a luminous screen consisting of phosphor layers (phosphor films).

It has been noted that the wavelength conversion efficiency of $(Ba, Sr)MgAl_{10}O_{17}$:Eu deteriorates with time, depending on how the device is used.

Various methods have been proposed in order to suppress the deterioration. For example, Japanese Laid-Open Patent Application No. H6-29418 discloses a method of adding 5 mol % or smaller amount of gadolinium to a phosphor material.

Further, Japanese Laid-Open Patent Application No. 2000-34478 discloses a method of coating a surface of phosphor particles with divalent metal silicate such as alkaline earth metal. In addition, Japanese Laid-Open Patent Application No. H10-330746 discloses a method of coating the surface of the phosphor particles with antimony (Sb) oxide.

Moreover, Japanese Laid-Open Patent Application No. 2003-213258 discloses that the proportion of divalent europium in the europium contained in $(Ba, Sr)MgAl_{10}O_{17}$:Eu is set in a range of 45% to 85%.

With the methods disclosed in No. H6-29418 and No. 2000-34478, however, the deterioration caused by the vacuum ultraviolet irradiation is not suppressed efficiently, even though the deterioration due to heat may be effectively suppressed.

In addition, with the method disclosed in No. H10-330746, it is not very easy, in practice, to evenly cover the surface of the phosphor particles with an Sb oxide film. It is also difficult to improve chromaticity shift and emission intensity maintaining ratio at the same time, because chromaticity shift and emission intensity maintaining ratio have an inverse relationship.

Moreover, with PDPs in which the above phosphors are used in the phosphor layers, so called "sticking image" is caused. The sticking image is a residual image of a specific color (an image in which blue is not properly displayed) that is continuously displayed, when a PDP is driven, as if the image was burnt in. The sticking image is caused because the chromaticity shift and the emission intensity of the Eu-activated phosphors change with time with relative ease. Such a sticking image impairs display performance.

Furthermore, the inventors of the present invention performed detailed investigations and have found that, in some cases, setting the proportion of the divalent Eu in the total amount of Eu in one phosphor particle as in No. 2003-213258 is not sufficient to achieve the intended effects such as suppressing the deterioration caused by heat during manufacture of the phosphor layers and such, and by vacuum ultraviolet irradiation when displaying images.

As described above, it is considered that further improvements are necessary in order to suppress the deterioration of the phosphors.

SUMMARY OF THE INVENTION

An object of the present invention is to provide a Eu-activated phosphor that maintains high wavelength conversion efficiency and suppresses deterioration with time due to vacuum ultraviolet irradiation.

Another object of the present invention is to provide a plasma display panel having superior display performance by suppressing a sticking image caused by deterioration of the phosphor with time.

In the detailed investigations performed in order to solve the above stated problems, the inventors of the present invention found that it is effective, in order to obtain a Eu-activated phosphor having both high maintaining ratio of emission intensity and high performance in suppressing the deterioration with Time to make a Ea concentration uneven in each phosphor particle between the particle as a whole and in the vicinity of a particle surface, as well as to control a distribution of divalent Eu and trivalent Eu in the phosphor particle.

Based on the above findings, the Eu-activated phosphor according to the present invention is a Eu-activated phosphor wherein a divalent europium ratio of a particle of the phosphor is lower at and in a vicinity of a particle surface than for the particle as a whole.

Here, the "vicinity of a particle surface" specifically indicates a region that is excited and emits light in the phosphor particle that is irradiated by short wavelength light such as ultraviolet light. More specifically, the region is around 10 nm in thickness from the particle surface, which can be confirmed by XPS method as explained later. Note that the thickness may be more than 10 nm in some cases, because energy to run into phosphor particles varies according to a wavelength of excitation light.

With the phosphor particles according to the present invention having the above structure, it is possible to obtain the Eu-activated phosphor that has high maintaining ratio of emission intensity and high performance in suppressing deterioration with time, in comparison with a conventional phosphor.

Further, by using the Eu-activated phosphor according to the present invention for a blue phosphor layer in a PDP, the phosphor layer emits light of desirable color even after driving for an extended length of time, and therefore it is possible to achieve a PDP having superior display performance with maintaining an appropriate color balance and suppressing the sticking image.

Currently, a principle mechanism of the effects achieved by the phosphor particles having the structure according to the present invention has not been fully explained yet. However, under a condition that an amount of Eu (concentration) in an entire particle is a certain amount, it is possible trivalent Eu exist more at the phosphor particle surface as a result by setting the composition of the phosphor as prescribed above at least. If a concentration of trivalent Eu is high, it is possible to suppress deoxidization in the vicinity of tho particle surface of the phosphor, and therefore the deterioration with time due to heat and ultraviolet light is suppressed with maintaining the wavelength conversion efficiency high. Therefore, it is conjectured that the problems such as the sticking image are suppressed as a result, by using the phosphor according to the present invention.

The inventors of the present invention further found that the present invention is especially effective when applied to a Eu-activated alkaline earth metal aluminate phosphor.

With the Eu-activated alkaline earth metal aluminate phosphor having the above structure, it is possible to suppress the deterioration with time with maintaining the wavelength conversion efficiency high.

BRIEF DESCRIPTION OF THE DRAWINGS

These and the other objects, advantages and features or the invention will become apparent from the following description thereof taken in conjunction with the accompanying drawings which illustrate a specific embodiment of the invention.

In the drawings.

DESCRIPTION OF THE PREFERRED EMBODIMENT

The following describes preferred embodiments of the present invention with reference to the drawings.

1. First Embodiment

Structure of Alkaline Earth Metal Aluminate Phosphor Particle

Figure 1:
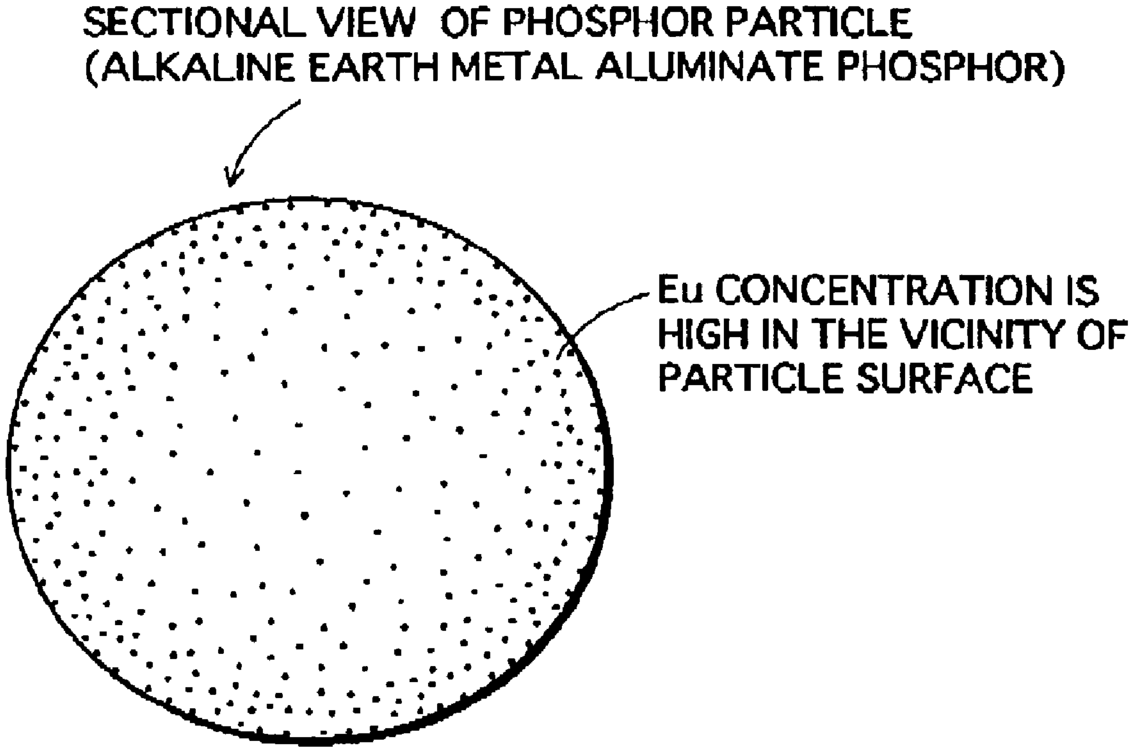
FIG. 1 is a schematic sectional view showing a structure of a phosphor particle (an alkaline earth metal aluminate phosphor particle) according to the present invention.

Described here is an exemplary structure of a Eu-activated phosphor according to a first embodiment of the present invention. FIG. 1 is a schematic sectional view illustrating the structure of a particle of the Eu-activated phosphor.

The particle is of an alkaline earth metal aluminate phosphor (blue phosphor) as one example of the Eu-activated phosphor, and has the following composition.

$$Ba_{1-x}Sr_yEu_zMgAl_{10}O_{17}:Eu$$

(x=0.20, y=0.10, and z=0.10)

Further, the structure of the phosphor particle is such that, as shown in FIG. 1, a Eu concentration at and in the vicinity of a particle surface (surface Eu concentration) is adjusted so as to be higher than a Eu concentration for the particle as a whole (bulk Eu concentration). In addition, a ratio of divalent Eu in all Eu in each particle (divalent Eu ratio) is adjusted to be lower at and in the vicinity of the particle surface than for the particle as a whole (the divalent Eu ratio at and in the vicinity of the particle surface is hereinafter referred to as surface divalent Eu ratio, and the divalent Eu ratio for the particle as a whole is referred to as bulk divalent Eu ratio).

More specifically, the bulk divalent Eu ratio is set to be in a range of 60% to 80% of the phosphor particle as a whole, and the surface divalent Eu ratio in the vicinity of the particle surface is set to be in a range of 4% to 15%. Eu is normally either divalent or trivalent, and therefore a bulk trivalent Eu ratio falls in a range of numbers derived by subtracting the above bulk divalent Eu ratio from 100.

As described above, with the phosphor particle having the above structure according to the first embodiment, the divalent Eu ratio at and in the vicinity of the particle surface is set lower, and an amount of trivalent Eu is relatively large in the vicinity of the particle surface.

Numbers for the surface Eu concentration and surface divalent Eu ratio of the phosphor particle prescribed in the present invention may be confirmed or set by measurement of X-ray Photoelectron Spectroscopy (XPS) using AlKα radiation as explained later.

According to the phosphor particle having the above structure according to the first embodiment, relatively high concentration of trivalent Eu prevents deoxidization in the vicinity of the particle surface. As a result, with the phosphor particle of the present invention, it is possible to maintain the phosphor composition in the vicinity of the particle surface at a desirable level, in comparison with a conventional phosphor. Accordingly, deterioration with time due to heat and vacuum ultraviolet irradiation may be suppressed with maintaining high wavelength conversion efficiency, and therefore it is possible to improve performance of the phosphor. Data showing specific effects of the phosphor particle according to the first embodiment will be described later.

The composition of the Eu-activated phosphor according to the present embodiment is not limited to the compositions listed above, and not limited to the alkaline earth metal aluminate phosphor (blue phosphor). The numbers for the x, y, and z indicated in the above composition may be adjusted according to required chromaticity, emission intensity, and degradation resistance of the phosphor.

Specifically, when increasing an amount y of Sr, chromaticity y becomes larger and luminance is improved, but a color reproduction range becomes smaller. Also, when increasing an amount z of Eu, the emission intensity becomes larger, but heat deterioration may be caused easily. The composition may be determined taking such property shifts into consideration.

For example, when using the phosphor having a composition defined below, an alkaline earth metal aluminate phosphor is obtained that may be adjusted to emit light in a range of blue to greenish blue.

$$Ba_{1-x}Sr_yEu_zMgAl_{10}O_{17} \quad \text{Definition:}$$

($0.05 \leqq x \leqq 0.40$, $0 \leqq y \leqq 0.25$, $0.05 \leqq z \leqq 0.30$, and $x-y \leqq z$ for the particle as a whole, and $3z \leqq z' \leqq 10z$ where z' is the surface Eu concentration)

In this case, it is desirable that the bulk divalent Eu ratio is set to be in a range of 60% to 95% for the particle as a whole, and the surface divalent Eu ratio in the vicinity of the particle surface is set to be in a range of 4% to 50%.

As another example, when using the phosphor having a composition defined below, an alkaline earth metal aluminate phosphor that is especially desirable for PDPs may be obtained.

$Ba_{1-x}Sr_yEu_zMgAl_{10}O_{17}$ Definition:

($0.15 \leqq x \leqq 0.25$, $0.05 \leqq y \leqq 0.15$, $0.05 \leqq z \leqq 0.15$, and $x-y \leqq z$ for the particle as a whole, and $7z \leqq z' \leqq 10z$ where z' is the surface Eu concentration)

In this case, it is desirable that the bulk divalent Eu ratio is set to be in a range of 60% to 80% of an entire phosphor particle, and the surface divalent Eu ratio in the vicinity of the particle surface is set to be in a range of 4% to 15%.

2. Second Embodiment

2-1 Manufacturing Method of Alkaline Earth Metal Aluminate Phosphor

Described here is an exemplary manufacturing method for the alkaline earth metal aluminate phosphor of the present invention.

2-1-1 Selection of Ingredients

An aluminum compound such as high-purity (at least 99%) aluminum hydroxide, aluminum nitrate or aluminum halide that becomes aluminate upon baking can be used as the aluminum source. High-purity (at least 99%) aluminate (the crystal form of which may be α-alumina or an intermediate alumina) may also be directly used.

A barium compound such as high-purity (at least 99%) barium hydroxide, barium carbonate, barium nitrate, barium halide or barium oxalate that becomes barium oxide upon baking can be used as the barium source. High-purity (at least 99%) barium oxide may also be used.

A calcium compound such as high-purity (at least 99%) calcium hydroxide, calcium carbonate, calcium nitrate, calcium halide or calcium oxalate that becomes calcium oxide upon baking can be used as the calcium source. High-purity (at least 99%) calcium oxide may also be used.

A strontium compound such as high-purity (at least 99%) strontium hydroxide, strontium carbonate, strontium nitrate, strontium halide or strontium oxalate that becomes strontium oxide upon baking can be used as the strontium source. High-purity (at least 99%) strontium oxide may also be used.

A magnesium compound such as high-purity (at least 99%) magnesium hydroxide, magnesium carbonate, magnesium nitrate, magnesium halide or magnesium oxalate that becomes magnesium oxide upon baking can be used as the magnesium source. High-purity (at least 99%) magnesium oxide may also be used.

A europium compound such as high-purity (at least 99%) europium hydroxide, europium carbonate, europium nitrate, europium halide or europium oxalate that becomes europium oxide upon baking can be used as the europium source. High-purity (at least 99%) europium oxide may also be used.

2-1-2 Mixture of Ingredients

Raw ingredients selected in the above manner are mixed after the selection is done. An example of specific amount of each raw ingredient to be mixed is listed below.

$BaCO_3$ 0.80 mol
$SrCO_3$ 0.10 mol
$Eu_2O_3$ 0.05 mol
$MgCO_3$ 1.00 mol
$Al_2O_3$ 5.00 mol The example is to manufacture an aluminate phosphor having the following composition.

$Ba_{1-x}Sr_yEu_zMgAl_{10}O_{17}$:Eu (x=0.20, y=0.10, and z=0.10)

It is possible to manufacture a Eu-activated phosphor having a different composition by changing the proportion of the raw ingredients to be mixed.

The raw ingredients can be mixed using, for example, an agitator or v-type mixer normally used in industry, or a ball mill, vibration mill or jet mill that has a powderizing function. It is desirable that the amount of each raw ingredients to be mixed is measured for confirmation before mixing.

A mixture powder of the raw ingredients is thus obtained.

2-1-3 Baking Process

Next, the mixture powder obtained as above is baked.

The manufacturing method according to the second embodiment is different from a conventional method in that hydrogen supply stops when temperature starts to fall in the baking process, and the rest of the baking process is performed in an inert gas atmosphere (e.g. an atmosphere containing only nitrogen).

An example of specific conditions for the baking process according to the present embodiment is a profile for a four-hour reduction firing in a furnace at 1500° C. in a mixture gas of nitrogen and hydrogen (for example, a mixture gas containing 96% nitrogen and 4% hydrogen).

Figure 2:
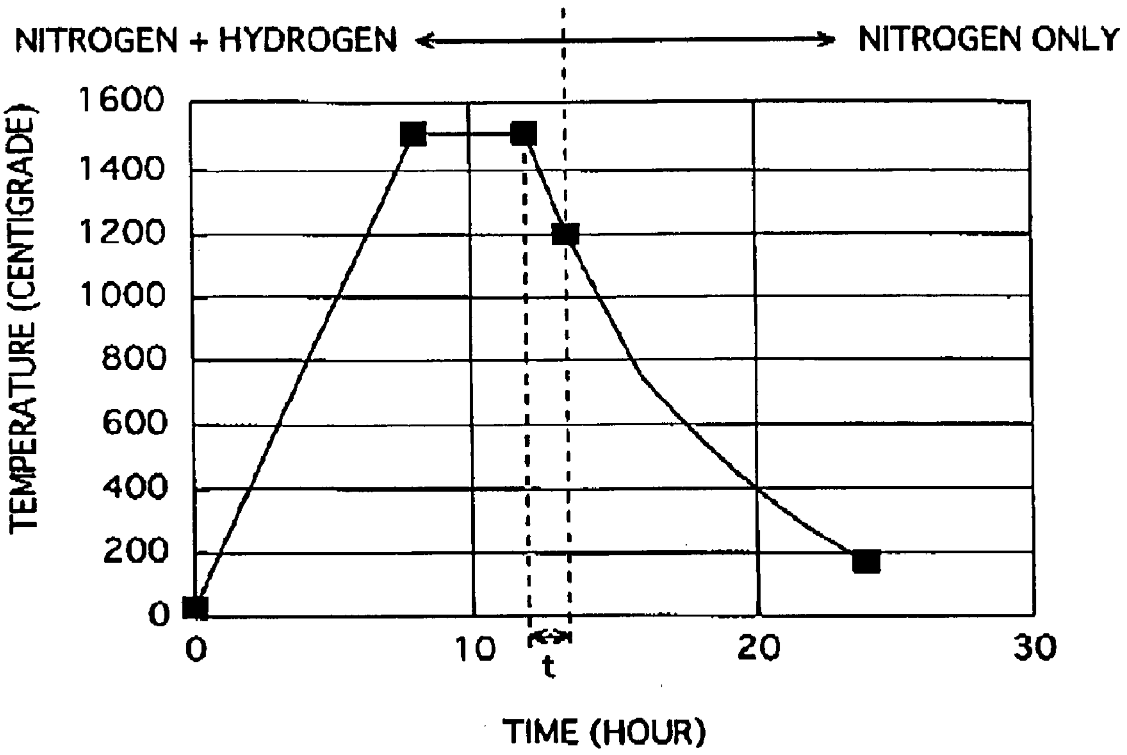
FIG. 2 is a graph showing a temperature profile and timing to supply hydrogen for reduction firing in a baking process.

FIG. 2 is an example of temperature profiles in the furnace. Time t in the graph is the time lapsed since the temperature fall starts.

In the temperature profile shown in FIG. 2, the temperature is set to reach the highest at 1500° C. in about seven hours after heating starts. Then the baking is performed for four hours at the highest temperature. After that, the atmosphere is set to be the inert gas atmosphere, and the temperature falls gradually for about ton hours.

In the second embodiment, the example in which the baking is performed for four hours at the temperature 1500° C. is explained. However, it is necessary to adjust the duration and temperature for the baking depending on conditions such as particle diameters of the mixture powder, an amount of flux to be used (such as $AlF_3$), and crystallinity of the alumina.

Further, the reduction firing in the second embodiment is performed to the mixture powder. However, it is also possible to bake the mixture powder in an air atmosphere prior to the baking process, in order to obtain a baked powder.

The alkaline earth metal aluminate phosphor in particles is thus manufactured.

2-2 Measurement of Composition of Phosphor

A specific method of measuring the composition of the phosphor particle of the present invention is explained below.

The surface Eu concentration and surface divalent Eu ratio in the vicinity of the particle surface can be measured using an X-ray photoelectron spectroscopy (XPS) technique, for example. With XPS, a sample surface is irradiated with X-rays of a known wavelength (generally AlK alpha or MgK alpha X-rays), and the energy of electrons that emit from the sample is measured. By comparatively monitoring the intensity of the energy, it is possible to selectively obtain information relating to the sample phosphor particle in the vicinity of the particle surface up to a depth of 10 nm from the particle surface. Because XPS reveals the relative sensitivity factor (RSF) of the characteristics obtainable from an element, this technique can be used to measure the surface Eu concentration of the phosphor particles and the composition ratio. An area of the phosphor particle in the vicinity of the particle surface according to the present invention indicates an area that is actually measured by XPS. The area varies as how deep the energy may reach varies according to the wavelength of the excitation light, and therefore the actual area in the vicinity of the particle surface in some cases exceeds the depth of 10 nm from the surface.

Further, with XPS, it is possible to measure a chemical shift for each element at which peak photoelectric energy shifts due to its chemical condition.

Figure 3A:
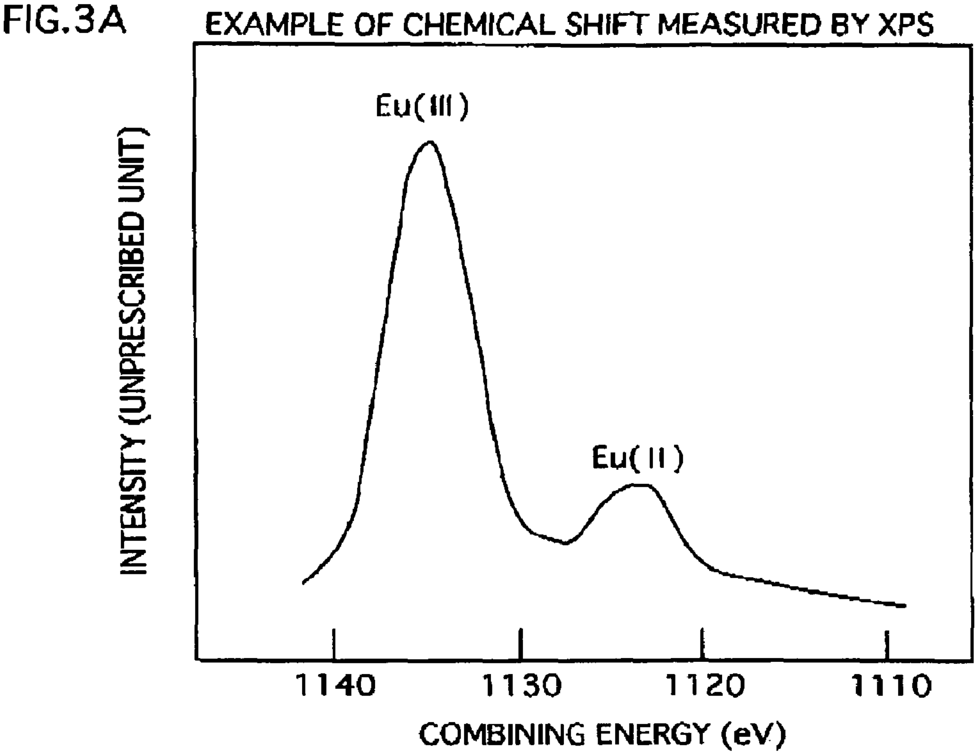
FIG. 3 shows an example of a $Eu3d_{5/2}$ peak of (Ba, Sr) $Mg_2Al_{10}O_{17}$:Eu measured by X-ray Photoelectron Spectroscopy (XPS), and an example of a EuL-shell edge absorption spectrum measured by X-ray Absorption Near Edge Structure (XANES)

With the phosphor (Ba, Sr)$MgAl_{10}O_{17}$:Eu according to the present invention, as shown in FIG. 3A, it is possible to clearly distinguish a peak near a combination energy 1124 eV due to the divalent Eu and a peak near 1132 eV due to the trivalent Eu, in terms of $Eu3d_{5/2}$ peaks. From an intensity ratio of the two peaks (i.e. a proportion of areas of the peaks illustrated in the drawing), it is possible to calculate the divalent Eu ratio in an entire Eu in the vicinity of the phosphor particle. Thus, the surface divalent Eu ratio may be measured by XPS. Note that an attention should be paid so as not to confuse with a peak of $Ba3p_{1/2}$ that appears near 1137 eV.

With the Eu-activated phosphor particle according to the present invention, the bulk divalent Eu ratio is specified, in addition to the surface divalent Eu ratio. An example of methods for measurement of the bulk divalent Eu ratio is X-ray Absorption Near Edge Structure (XANES). The XANES is a method to measure chemical state of a specific element by a fine structure of inner shell absorption spectrum using X-rays. In order to measure the divalent Eu ratio, an L absorption edge among the spectrum is used.

Figure 3B:
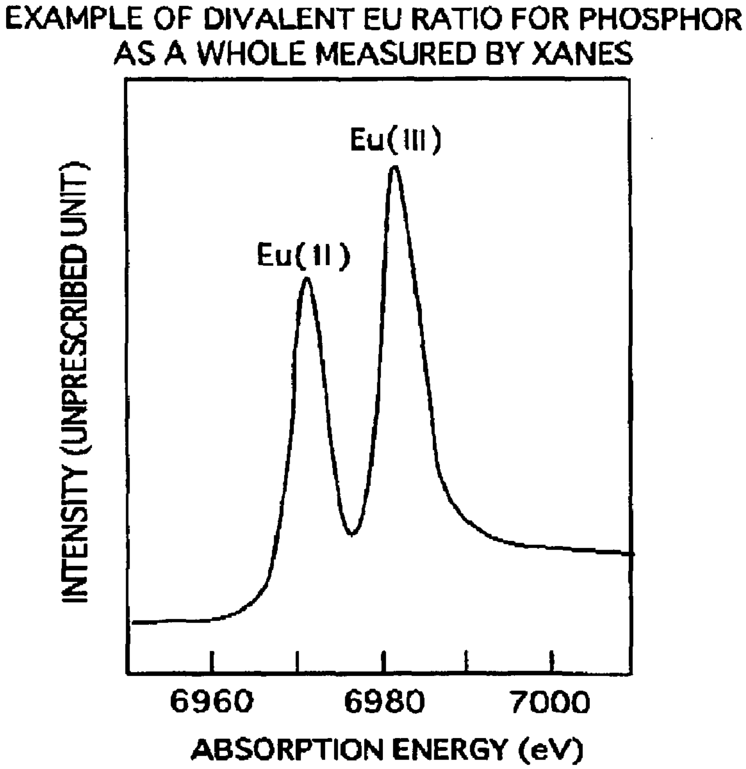

As shown in FIG. 3B, absorption of the divalent Eu (Eu (II)) appears near 6970 eV, and absorption of the trivalent Eu (Eu (III)) appears near 6980 eV. The divalent Eu ratio is calculated from an intensity ratio of the two peaks (i.e. expressed by a proportion of areas of the peaks illustrated in the drawing).

Other than the absorption method to directly measure the absorption, the XANES includes a secondary electron method that measures Auger electrons generated following the X-ray absorption, and a fluorescence method that measures fluorescence X-ray generated following the X-ray absorption as well. In order to specify the phosphor of the present invention, the fluorescence method, whose dependency in a depth direction is relatively small, is used.

Other methods for measurement of the bulk divalent EU ratio include a method in which samples are dissolved in an acid or alkaline solution and then the bulk divalent Eu ratio is derived by redox titration, and a method that uses a difference between magnetic susceptibilities of the divalent Eu and trivalent Eu.

2-3 Maintaining Ratio of Emission Intensity

Performance of the alkaline earth metal aluminate phosphor manufactured using the method according to the second embodiment is measured by the XPS and XANES.

Table 1 shows relations of the bulk Eu concentration, surface Eu concentration, bulk divalent Eu ratio and surface divalent Eu ratio of the phosphor particle manufactured, an initial value of emission intensity Y/y of the phosphor particle when excited by vacuum ultraviolet (VUV) irradiation having a wavelength of 146 nm, the emission intensity Y/y after 100 hours of vacuum ultraviolet irradiation, and an emission intensity maintaining ratio Y/y % after the irradiation, respectively to Time t (for reduction firing while the temperature fall from the highest temperature in an atmosphere of nitrogen and hydrogen).

TABLE 1

| Time t (h) | Proportion of Eu in Composition (when Al is 10 mol) Bulk | Surface | Eu (II) (%) Bulk | Surface | Y/y Initial Value | After 100 hours | Maintaining Ratio (%) |
|---|---|---|---|---|---|---|---|
| 10 | 0.10 | 0.10 | 90 | 70 | 100 | 75 | 75 |
| 8 | 0.10 | 0.12 | 88 | 58 | 92 | 76 | 83 |
| 6 | 0.10 | 0.30 | 85 | 48 | 88 | 75 | 85 |
| 4 | 0.10 | 0.37 | 83 | 42 | 86 | 75 | 87 |
| 2 | 0.10 | 0.52 | 81 | 21 | 85 | 77 | 90 |
| 0 | 0.10 | 0.70 | 80 | 15 | 77 | 73 | 95 |
| −2 | 0.10 | 0.88 | 75 | 11 | 75 | 74 | 98 |

After performing the reduction firing in an atmosphere of nitrogen and hydrogen for a predetermined length of Time the temperature falls in an atmosphere of the inert gas of nitrogen.

The Y and y indicate luminance Y and chromaticity y, respectively, according to CIE 1931 standard colorimetric system set forth by commission Internationale de l'Eclairage (CIE). The Y/y is a relative value. Also, numbers where the Time t is 10 hours are data of a comparison example.

As clearly shown by the data in Table 1, the emission intensity maintaining ratio Y/y % increases as the surface Eu concentration becomes higher and the surface divalent Eu ratio becomes lower. Generally speaking, in phosphors, the emission intensity maintaining ratio Y/y % becomes higher as the Time t becomes shorter. Accordingly, in a case in which the Time t=2, where 2 hours out of 4 hours of baking is performed in the nitrogen atmosphere as well as during the temperature fall for example, the surface Eu concentration is 0. 88 (standardized given that Al is 10 mol), 9 times as high as the bulk Eu concentration 0.10. In this case, the bulk divalent Eu ratio is 65%, and the surface divalent Eu ratio is 11%.

Therefore, with the phosphor particle manufactured by the method according to the second embodiment, Eu moves in the vicinity of the particle surface so as to increase the surface Eu concentration. Moreover, it is also confirmed that a majority of the Eu in the vicinity of the particle surface are trivalent Eu.

3. Third Embodiment

Described here in an exemplary manufacturing method for another kind of the alkaline earth metal aluminate phosphor according to a third embodiment.

Measuring and mixing of the raw ingredients are the same as in the method according to the second embodiment. A main characteristic of the method of the third embodiment is in that an entire baking process is performed under a reduction atmosphere including the temperature fall.

Next, heat treatment is performed for a couple hours at 700° C., under an inert atmosphere such as a nitrogen atmosphere.

With the above method, it is possible to obtain the phosphor according to the present invention.

3-1 Maintaining Ratio of Emission Intensity

Performance and the Eu concentration of the phosphor manufactured by the method according to the third embodiment is measured. In the measurement, the XPS and XANES are used.

Table 2 shows relations between Time s for heat treatment under the nitrogen atmosphere and various properties of the phosphor, in the same way as in Table 1 of the second embodiment.

TABLE 2

| Time s (h) | Proportion of Eu in Composition (when Al is 10 mol) Bulk | Surface | Eu (II) (%) Bulk | Surface | Y/y Initial Value | After 100 hours | Maintaining Ratio (%) |
|---|---|---|---|---|---|---|---|
| 0 | 0.10 | 0.11 | 92 | 72 | 100 | 75 | 75 |
| 5 | 0.10 | 0.30 | 85 | 56 | 85 | 72 | 85 |
| 10 | 0.10 | 0.32 | 83 | 51 | 83 | 72 | 87 |
| 15 | 0.10 | 0.32 | 83 | 51 | 82 | 71 | 87 |
| 20 | 0.10 | 0.40 | 81 | 49 | 80 | 72 | 90 |

As clearly shown by the data in Table 2, in the third embodiment, as in the second embodiment, the emission intensity maintaining ratio Y/y % increases as the surface Eu concentration is higher and the surface divalent Eu ratio is lower in the phosphor particle. The emission intensity maintaining ratio Y/y % rises as the Time s becomes longer.

In a case in which the Time s=20, the surface Eu concentration is 0.40 (standardized given that Al is 10 mol), 4 times as high as the bulk Eu concentration 0.10. In this case, the bulk divalent Eu ratio is 81%, and the surface divalent Eu ratio is 49%.

Although the heat treatment is performed at 700° C. in the third embodiment, the present invention is not limited to this example, and the temperature may be adjusted accordingly. The temperature and duration for the heat treatment may be set according to relations to the value of Y/y and maintaining ratio, for example, because the value of Y/y decreases and the maintaining ratio after the VUV irradiation improves when the temperature and duration for the heat treatment are set to be higher and longer, respectively.

Further, although the heat treatment is performed in the nitrogen atmosphere in the above example, it is also possible to perform the heat treatment under an atmosphere of another type of gas, for example, a rare gas such as argon gas.

It is also found out, in other measurement and experiment using the XPS, that the emission intensity maintaining ratio of the phosphor of the present invention is improved markedly, when the relation between the bulk Eu concentration z and surface Eu concentration z' satisfies $3z \leqq z' \leqq 10z$. It is especially desirable when the range is $7z \leqq z' \leqq 10z$.

In addition, for the divalent Eu, it is desirable that the bulk divalent Eu ratio is in a range of 60% to 95%, and the surface divalent Eu ratio is in a range of 4% to 50%.

In a case in which the phosphor is used as the blue phosphor for PDPs, it is especially desirable that the bulk divalent Eu ratio is in a range of 60% to 80%, and the surface divalent Eu ratio is in a range of 4% to 15%.

3-2 Atmosphere in Baking Process

In the above explanations about the manufacturing methods according to the second and third embodiments, details are described about such examples in which the supply of hydrogen stops when the temperature falls in the baking process under the reduction atmosphere, and in which the heat treatment is done under the inert gas atmosphere after the reduction firing. However, the manufacturing method of the Eu-activated phosphor according to the present invention is not limited to the methods according to the second and third embodiments. Any manufacturing method may be adopted, if it is possible, with the selected method, to obtain a Eu-activated phosphor whose surface Eu concentration is higher than its bulk concentration and whose surface divalent Eu ratio is lower than the bulk divalent Eu ratio.

Specific examples of the manufacturing methods other than the methods according to the second and third embodiments include a method in which the baking is performed in the reduction atmosphere and then the heat treatment is performed to the baked powder after Eu2o3 is added, and a method in which the phosphor particles are formed in a conventional method and then surface oxidization treatment is performed to the surface of the particles. Specifically,the surface oxidization treatment may be performed by a method such as a plasma treatment under an atmosphere containing oxygen, an ultraviolet irradiation under an atmosphere also containing oxygen, a treatment under an atmosphere containing ozone, or a treatment under an atmosphere containing oxygen radical.

In the above embodiments, the phosphor having the composition (Ba, Sr)$MgAl_{10}O_{17}$:Eu is explained. However, the effects of the present invention may be obtained with other Eu-activated phosphors such as (Ca, Sr, Ba)$MgSi_2O_6$:Eu, $(Ca, Sr, Ba)_2MgSi_2O_7$:Eu, $(Ca, Sr, Ba)_3MgSi_2O_8$:Eu, and $Sr_3Al_{10}SiO_20$:Eu.

4. Fourth Embodiment

Figure 4:
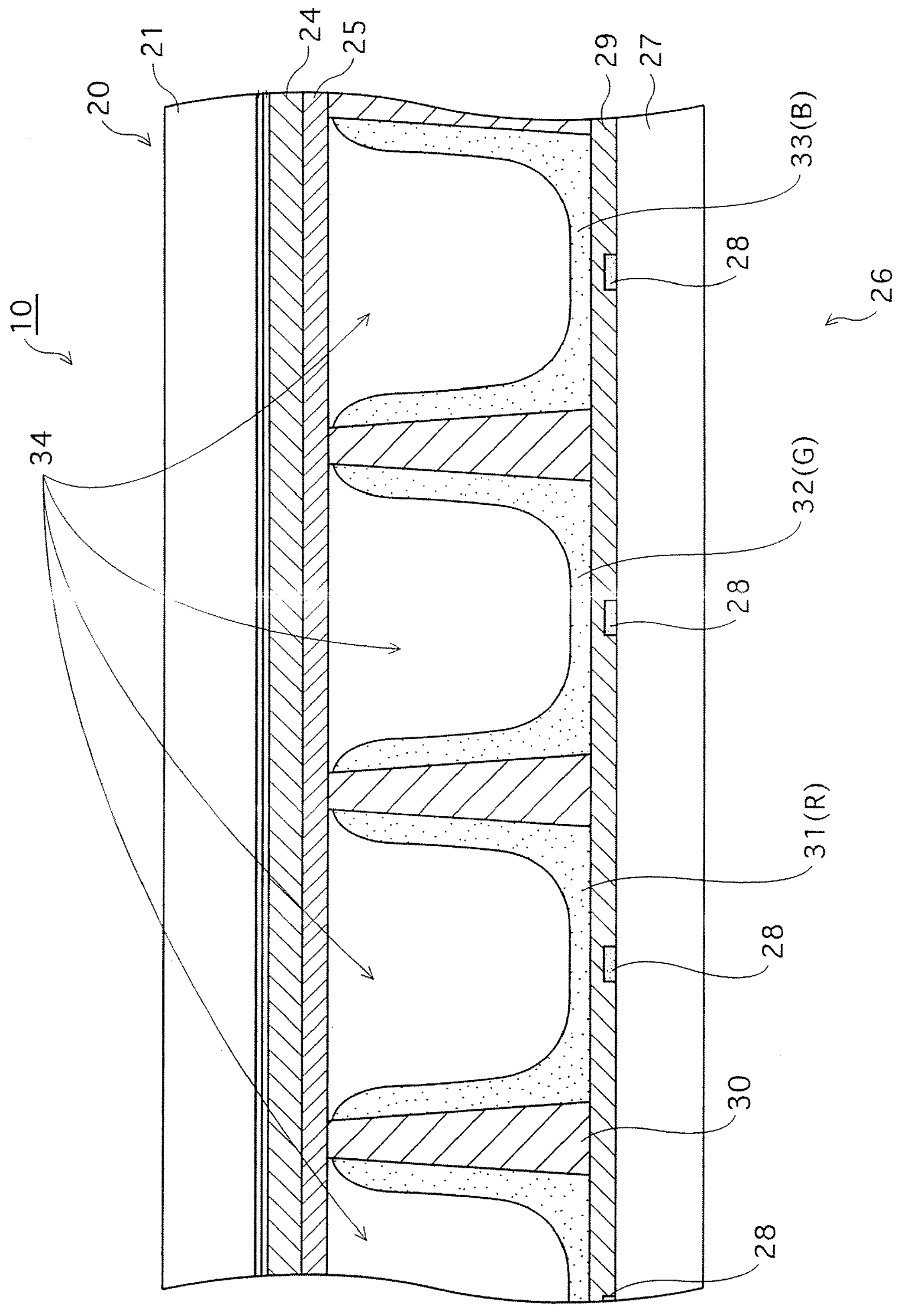
FIG. 4 shows a structure of a plasma display panel according to a fourth embodiment.

FIG. 4 is an enlarged partial sectional view illustrating a structure of a surface-discharge AC plasma display panel 10 (PDP 10) according to a fourth embodiment according to the present invention.

A size of the PDP 10 is based on a VGA standard for a 42 inch class PDP. However, the PDP 10 may be compliant with a different standard with a different size.

As shown in FIG. 4, the PDP 10 includes a front panel 20 and back panel 26 that are disposed so as to face each other.

Pairs of display electrodes (X electrodes and Y electrodes are disposed in parallel in an X direction on one surface of a front panel glass 21, which is a substrate of the front panel 20. Each of the X, Y display electrodes is made of a ribbon shaped transparent electrode, which is 0.1 μm in thickness and 150 μm in width, and a bus line which is 7 μm in thickness and 95 μm in width and is layered on the transparent electrode. The X electrode and it's transparent electrode are positioned behind the Y electrode 22, transparent electrode 220 and bus line 221 of the drawing, and not shown in the drawing.

Each of the X, Y display electrodes of each pair are electrically connected to a panel driving circuit (not shown in the drawing) in the vicinity of an edge in widthwise direction (Y direction) of the front panel glass 21. At this time, the Y electrodes 22 of the pairs of display electrodes are connected to the panel driving circuit all together, and each X electrode of each pair is connected to the panel driving circuit separately. By this, when power is supplied to the Y electrodes 22 and X electrodes from the panel driving circuit, surface discharge (sustain discharge) is performed in a gap (about 80 μm) between the pair of X, Y display electrodes.

Further, the X electrode also works as a scan electrode, a write discharge (address discharge) is performed between an address electrode 28.

The surface of the front panel glass 20 on which the pairs of X, Y display electrodes are disposed is coated by a dielectric layer 24 that is about 30 μm in thickness, so as to cover the pairs of X, Y display electrodes. Moreover, a protective layer 25 that is about 1.0 μm in thickness is layered on the dielectric layer 24.

Plural address electrodes 28, which is 5 μm in thickness and 60 μm in width, are disposed in parallel in the Y direction on one surface of a back panel glass 27, which is a substrate of the back panel 26. An example of a pitch between two adjacent address electrodes 28 is about 150 μm. The plural address electrodes 28 are each connected to and supplied from the panel driving circuit separately. Each of the address electrodes 28 performs address discharge between a corresponding X electrode.

The surface of the back panel glass 27 on which the address electrodes 28 are disposed is coated by a dielectric layer 29 that is about 30 μm in thickness, so as to cover the address electrodes 28. Moreover, barrier ribs 30 that are about 150 μm in height and 40 μm in width are each disposed between two adjacent address electrodes 28 at the same interval as the pitch, in the X direction.

One of phosphor layers 31, 32, and 33 respectively corresponding to red (R), green (G), and blue (B) colors is disposed on walls of two adjacent barrier ribs and on a surface of the dielectric layer 29 between the two barrier ribs. The RGB phosphor layers are disposed in a given order repeatedly in the Y direction.

The front panel 20 and back panel 26 are disposed facing each other so that the address electrodes 28 and pairs of X, Y display electrodes cross orthogonal, and joined to each other at a circumference. By this, a space between the panels 20 and 26 is sealed. In the space between the panels 20 and 26, a discharge gas containing a rare gas element selected from He, Xe, and Ne is enclosed at a predetermined pressure (normally around a range of 6.7×104 to 1.0×105 Pa). A gap between the two adjacent barrier ribs 30 is a discharge space 34. An area where one of the address electrodes 28 crosses with one of the pairs of X, Y display electrodes with the discharge space 34 therebetween corresponds to a cell for displaying an image.

One possible example of a cell pitch is such that about 1080 μm in the X direction, and about 360 μm in the Y direction.

When driving the PDP 10 having the above structure, the panel driving circuit applies pulse voltages to specific address electrodes 28 and X electrodes 23 so as to generate the address discharge. After the address discharge, short wavelength ultraviolet rays (a resonance line with a center wavelength of about 147 μm) are generated by the sustain discharge generated by applying the pulse voltages between the pair of X, Y display electrodes alternately. By this ultraviolet irradiation, the phosphors in the phosphor layers 31, 32, and 33 emit visible light so as to display an image.

In the fourth embodiment, compositions of red and green phosphors used in the phosphor layers 31 and 32 are the compositions that are commonly used. However, blue phosphor used here is the alkaline earth metal aluminate phosphor having the following composition.

$$Ba_{1-x}Sr_yEu_zMgAl_{10}O_{17}$$

($0.15 \leqq x \leqq 0.25$, $0.05 \leqq y \leqq 0.15$, $0.05 \leqq z \leqq 0.15$, and $x-y \leqq z$ in an entire particle, and $7z \leqq z' \leqq 10z$ where z' is the surface Eu concentration)

The aluminate phosphor having the above composition is manufactured by the same phosphor particles explained in the first to third embodiments. The phosphor layers are formed in the following manner using a phosphor ink made of the above phosphor particles.

The phosphor ink is made by mixing, for example, 30 wt % blue phosphor particles whose average diameter is 2 μm, 4.5 wt % ethylcellulose whose molecular weight is about 200,000, and 65.5 wt % solvent (butylcarbitolacetate). It is desirable to adjust viscosity of the ink to be in a range of 2000 to 6000 cps in application, so that the phosphor ink sufficiently adhere to the barrier ribs 30. The phosphor ink obtained in the above manner is applied using meniscus method, for example, and the phosphor layers 31, 32, and 33 having excellent properties and high efficiency are completed, after drying and baking the applied phosphor ink (at 500° C. for 10 minutes, for example).

The composition of the ink is not limited to the above example. It is also possible to use a method other than the meniscus method to apply the phosphor ink (for example, line-jet method).

The PDP 10 manufactured in the above method using the phosphor particles according to the present invention demonstrates an excellent display performance. Specifically, by using the Eu-activated phosphor according to any of the first to third embodiments, which has higher emission intensity maintaining ratio in comparison with the conventional phosphor, it is possible to realize an excellent coloring property, even after driving for an extended length of time, in comparison with the conventional phosphor. Therefore, it is possible to obtain PDPs demonstrating excellent display performance by suppressing a sticking image, which is a residual image with a specific color (an image in which blue is not properly displayed) remains on the screen when the proportion of phosphors having each color changes as the duration of driving becomes longer.

Figure 5:
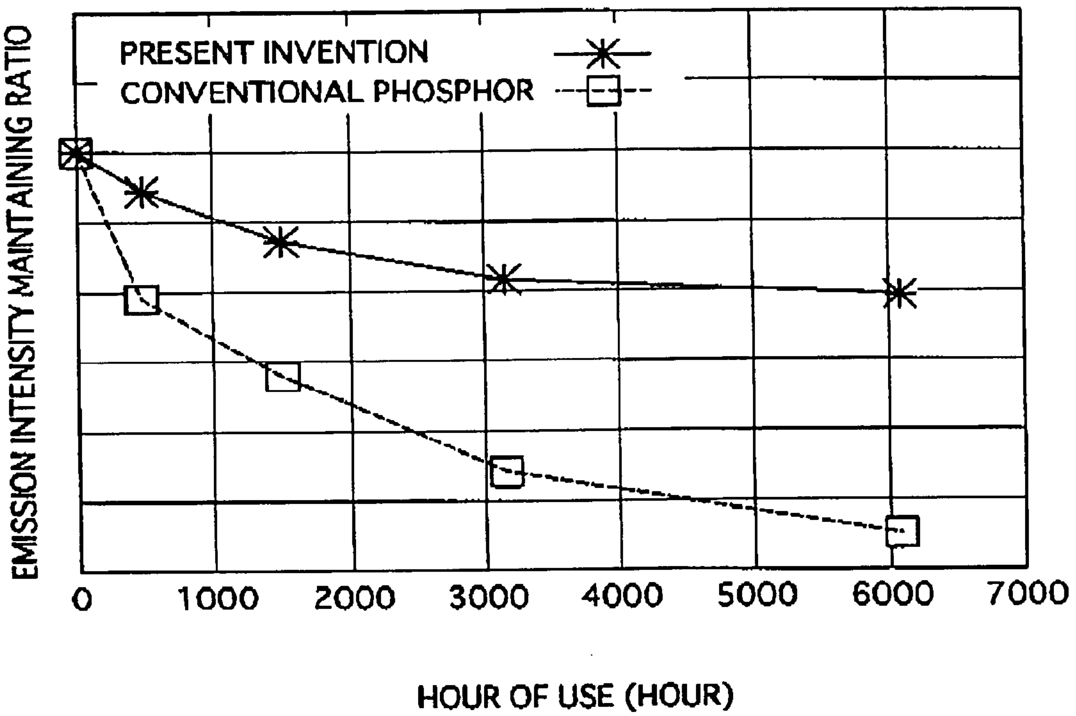
FIG. 5 is a graph comparing luminance shift (maintaining ratio of emission intensity) of the plasma display panel according to the present invention and a conventional plasma display panel.

FIG. 5 is a graph showing the characteristics of the phosphor of the present invention and a conventional example. The conventional example is a phosphor that is manufactured by setting Time t=10 for the baking under the reduction atmosphere as explained in the second embodiment (room temperature). The phosphor of the present invention is the phosphor where the Time t=0 for the baking under the reduction atmosphere. Only blue color is displayed on the panels. The unit of the emission intensity maintaining ratio is unprescribed.

As is clear from FIG. 5, with the PDP according to the present invention, in comparison with the conventional phosphor, luminance deterioration with time is suppressed and the sticking image caused by decrease of the wavelength conversion efficiency may be effectively suppressed.

Further, it is confirmed by another experiment that shifts in the coloring of tho phosphor according to the present invention is not very different from the conventional phosphors, and excellent.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A europium-activated phosphor, comprising;

a divalent europium ratio of a particle of the phosphor is lower at and in a vicinity of a particle surface than for the particle as a whole and an average europium concentration of the particle of the phosphor is higher at and in the vicinity of a particle surface than for the particle as a whole, wherein the europium-activated alkaline earth metal aluminate phosphor whose composition is $Ba_{1-x}$ $Sr_yEu_zMgAl_{10}O_{17}$, where $0.05 \leqq x \leqq 0.40$, $0 \leqq y \leqq 0.25$, $0.05 \leqq z \leqq 0.30$, and $x-y \leqq z$ for the particle as a whole, and $3z \leqq z' \leqq 10z$ at and in the vicinity of the particle surface, z' being a europium concentration, and to divalent europium ratio is a ratio of divalent europium to a sum total of trivalent europium and the divalent europium in a predetermined part of the particle.

2. A europium-activated alkaline earth metal aluminate phosphor including a particle, a divalent europium ratio of which is lower at and in a vicinity of a particle surface than for the particle as a whole, wherein an average europium ratio of the particle is higher at and in the vicinity of the particle surface than for the particle as a whole, composition of the europium-activated alkaline earth metal aluminate phosphor is $Ba_{1-x}Sr_yEu_zMgAl_{10}O_{17}$, where $0.15 \leqq x \leqq 0.25$, $0.05 \leqq y \leqq 0.15$, $0.05 \leqq z \leqq 0.15$, and $x-y \leqq z$ for the particle as a whole, and $7z \leqq z' \leqq 10z$ at and in the vicinity of the particle surface, and the divalent europium ratio is a ratio of divalent europium to a sum total of trivalent europium and the divalent europium in a predetermined part of the particle.

3. A plasma display panel having a blue phosphor layer wherein the blue phosphor layer includes the europium-activated phosphor as defined in claim 2 as a constituent element.

4. A method of manufacturing a europium-activated phosphor as in claim 2, the method including a baking process comprising:

a first step of baking a material for the phosphor while exposed to a reduction atmosphere, the material being one of a mixture powder of raw ingredients and a baked powder that is obtained by baking the mixture powder in air prior to the baking process; and a second step of baking the material while exposed to an inert atmosphere after the first step wherein the second step is performed when temperature falls in the baking process.

5. A method according to claim 4, wherein the reduction atmosphere is a mixed atmosphere of nitrogen and hydrogen, and the inert atmosphere is a nitrogen atmosphere.

6. The europium-activated alkaline earth metal aluminate phosphor of claim 1 wherein the vicinity of the particle surface is approximately 10 nm for activation by ultraviolet light.

7. The europium-activated alkaline earth metal aluminate phosphor of claim 2 wherein the vicinity of the particle surface is approximately 10 nm for activation by ultraviolet light.

* * * * *